United States Patent
Sugihara

(10) Patent No.: US 6,656,081 B2
(45) Date of Patent: Dec. 2, 2003

(54) RATIO CONTROL FOR TOROIDAL-TYPE TRACTION DRIVE INCORPORATING LOST MOTION CAM ACTUATOR

(75) Inventor: Jun Sugihara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/083,501

(22) Filed: Feb. 27, 2002

(65) Prior Publication Data

US 2002/0142882 A1 Oct. 3, 2002

(30) Foreign Application Priority Data

Mar. 27, 2001 (JP) .......................................... 2001-089217

(51) Int. Cl.[7] .............................................. F16H 15/38
(52) U.S. Cl. ........................................... 476/10; 476/40
(58) Field of Search ............................. 476/10, 40, 42, 476/46

(56) References Cited

U.S. PATENT DOCUMENTS

| | | | | |
|---|---|---|---|---|
| 3,142,189 A | * | 7/1964 | David et al. .................. | 476/10 |
| 4,572,016 A | * | 2/1986 | Okoshi ......................... | 476/40 |
| 5,029,487 A | * | 7/1991 | Perry ........................... | 476/33 |
| 5,885,185 A | | 3/1999 | Kidokoro et al. ............. | 476/10 |
| 5,902,207 A | * | 5/1999 | Sugihara ...................... | 476/10 |
| 5,902,208 A | | 5/1999 | Nakano ........................ | 476/42 |
| 6,080,079 A | * | 6/2000 | Sakai ............................ | 476/10 |
| 6,086,505 A | | 7/2000 | Sakai ............................ | 476/10 |
| 6,123,641 A | | 9/2000 | Sugihara ...................... | 476/10 |
| 6,152,849 A | * | 11/2000 | Mori et al. ................... | 476/10 |
| 6,565,478 B2 | * | 5/2003 | Yamamoto ................... | 476/40 |
| 2001/0046920 A1 | | 11/2001 | Sugihara et al. ............. | 476/10 |

FOREIGN PATENT DOCUMENTS

JP          10-89433          4/1998

\* cited by examiner

*Primary Examiner*—David A. Bucci
*Assistant Examiner*—Timothy McAnulty
(74) *Attorney, Agent, or Firm*—Foley & Lardner

(57) ABSTRACT

A ratio control for a toroidal-type traction drive comprises toroidal discs defining a toroidal cavity. Traction roller assemblies have pivot trunnions rotatably supporting traction rollers. A ratio control element is provided, which is positionable to establish various ratios between the toroidal discs. A feedback structure is connected to the ratio control element and includes a ratio control valve to hydraulically control the traction roller assemblies, and a cam follower. A feedback cam is provided, which cooperates with the cam follower. A lost motion cam actuator is provided between a predetermined pivot trunnion and the feedback cam to permit limited independent deflected movement of the predetermined pivot trunnion from the pivot axis thereof without requiring corresponding movement of the feedback cam.

20 Claims, 8 Drawing Sheets

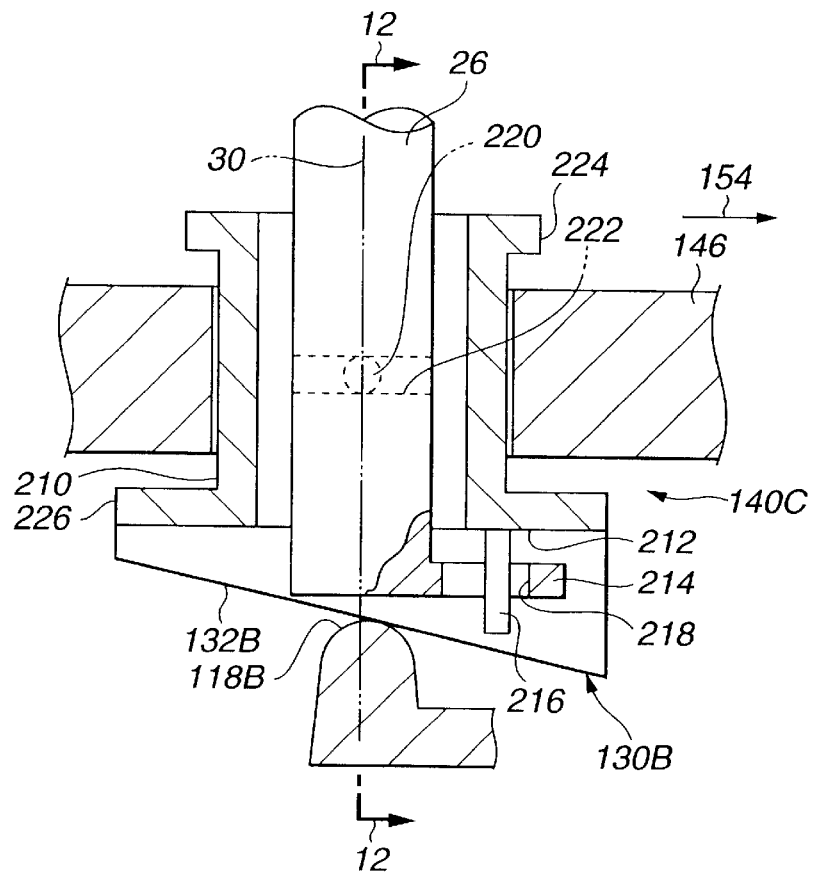
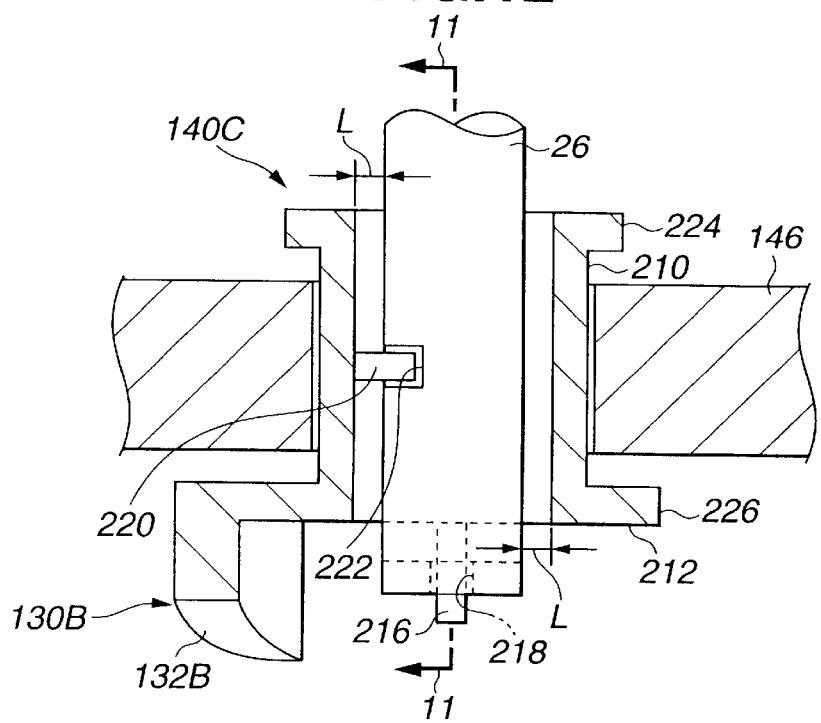

RATIO CONTROL FOR TOROIDAL-TYPE TRACTION DRIVE INCORPORATING LOST MOTION CAM ACTUATOR

BACKGROUND OF THE INVENTION

1. Field of the Invention

The present invention relates to ratio controls for toroidal-type traction drives.

2. Description of the Background Art

Continuously variable transmissions (CVT's) are transmissions that change a speed ratio continuously, not in discrete intervals. This continuous nature of CVT's gives them an infinite number of speed ratios, making them very attractive for automotive use.

Various types of CVT are known. One such example is a CVT with pulley/V-belt power transfer. Another example is a CVT with disc/roller power transfer. The CVT of this type is often referred to as a toroidal-type CVT (T-CVT) because it transmits torque from one rotating semi-toroidal disc to another semi-toroidal disc by traction rollers through a traction force. The two semi-toroidal discs form a toroidal cavity. In each toroidal cavity, it is preferred to have two traction rollers in equiangularly spaced relationship engaging the discs for transmission of motion therebetween. While three or four traction rollers may be disposed in spaced relationship in each toroidal cavity and will provide increased life for contact surfaces as the total surface area is increased, two traction rollers are preferred for simplicity.

Traction roller are rotatably supported by pivot trunnions, respectively. The pivot trunnions, in turn, are supported to pivot about their respective pivot axis. In order to controllably pivot the pivot trunnions for a ratio change, a hydraulic control means is provided. The hydraulic control means is included in a hydraulic cylinder at each pivot trunnion and includes a control volume defined in the hydraulic cylinder between a piston and an axial end of the hydraulic cylinder. The pistons within the hydraulic cylinders are connected to the pivot trunnions along their pivot axis by rods. The piston and its associated rod are thereby rotatable about the pivot axis with the associated pivot trunnion. Variation of the control volume causes the piston to move relative to the hydraulic cylinder, and applies a control force to displace the pivot trunnions. Control forces applied displace the pivot trunnions in the opposite directions along their pivot axis. As a result, the pivot trunnions are caused to pivot about their respective pivot axis, due to the forces present in the rotating toroidal discs, for initiating ratio change.

For terminating the ratio change upon attainment of a desired ratio, a feedback structure or mechanism is provided. The feedback structure preferably includes a source of hydraulic pressure, and a ratio control valve for controlling the flow of hydraulic fluid for initiating ratio change. The feedback structure further includes a mechanism associated with at least one pivot trunnion to adjust the ratio control valve upon pivotal movement of the pivot trunnion to a desired ratio. The mechanism is preferably a feedback cam connected to a pivot trunnion. The cam may be linked mechanically and/or electronically to operate the ratio control valve upon reaching a desired rotation.

In most cases, a feedback cam is fixed to the bottom end of a predetermined traction roller assembly including a trunnion. The trunnion includes a backing plate with an extension about which a traction roller rotates so that it is subject to thrust load. Thrust load increases as input torque increases. To withstand such thrust load, the trunnion is supported at two spaced mount sites. At high input torque, the traction roller is urged inwardly into the traction cavity, pulling the trunnion inwardly at a portion between the two mount sites. In such stressed state, the trunnion is bent with the two spaced mount sides as fulcrum points. In particular, the middle portion of the trunnion between the two spaced mount sites moves inwardly into the traction cavity in one direction parallel to the axis of rotation of traction roller, while, the two remaining end portions move in the opposite direction. Such deviated moment of the trunnion from the pivot axis requires the corresponding movement of the feedback cam. The amount of such deviated movement varies with different magnitudes of input torque, causing varying of feedback information as to the same angular position of the trunnion with the different magnitudes of input torque.

A need remains for development of a ratio control wherein a feedback cam provides accurate feedback information over wide operating range of different magnitudes of input torque.

Various ratio control systems using a feedback cam have been proposed and assigned to the assignee of the present invention. One such example is shown in U.S. Pat. No. 5,885,185 issued Mar. 23, 1999 to Kidokoro et al. Another example is shown in U.S. Pat. No. 6,086,505 issued Jul. 11, 2000 to Sakai. Still another example is shown in U.S. Pat. No. 6,123,641 issued Sep. 26, 2000. Other example is shown in U.S. Patent Application Publication No. US2001/0046920 A1 published Nov. 29, 2001.

SUMMARY OF THE INVENTION

An object of the present invention is to provide a ratio control wherein a feedback cam provides accurate feedback information over wide operating range of different magnitudes of input torque.

According to one aspect of the present invention, there is provided a ratio control for a toroidal-type traction drive, comprising:

toroidal discs defining a toroidal cavity;

traction roller assemblies having pivot trunnions rotatably supporting traction rollers disposed in the toroidal cavity and engaged between the toroidal discs, each of the pivot trunnions having a pivot axis, the pivot trunnions including a predetermined pivot trunnion;

a ratio control element positionable to establish various ratios between the toroidal discs;

a feedback structure connected to the ratio control element and including a ratio control valve to hydraulically control the traction roller assemblies, and a cam follower;

a feedback cam cooperating with the cam follower; and a lost motion cam actuator between the predetermined pivot trunnion and the feedback cam to permit limited independent deflected movement of the predetermined pivot trunnion from the pivot axis thereof without requiring corresponding movement of the feedback cam.

BRIEF DESCRIPTION OF THE DRAWINGS

Further objects and advantages of the invention will be apparent from reading of the following description in conjunction with the accompanying drawings.

FIG. 11 is a cross section taken through the line 11—11 in FIG. 12, showing a fourth exemplary embodiment according to the present invention.

FIG. 12 is a cross section taken through the line 12—12 in FIG. 11.

DETAILED DESCRIPTION OF THE INVENTION

Figure 1:
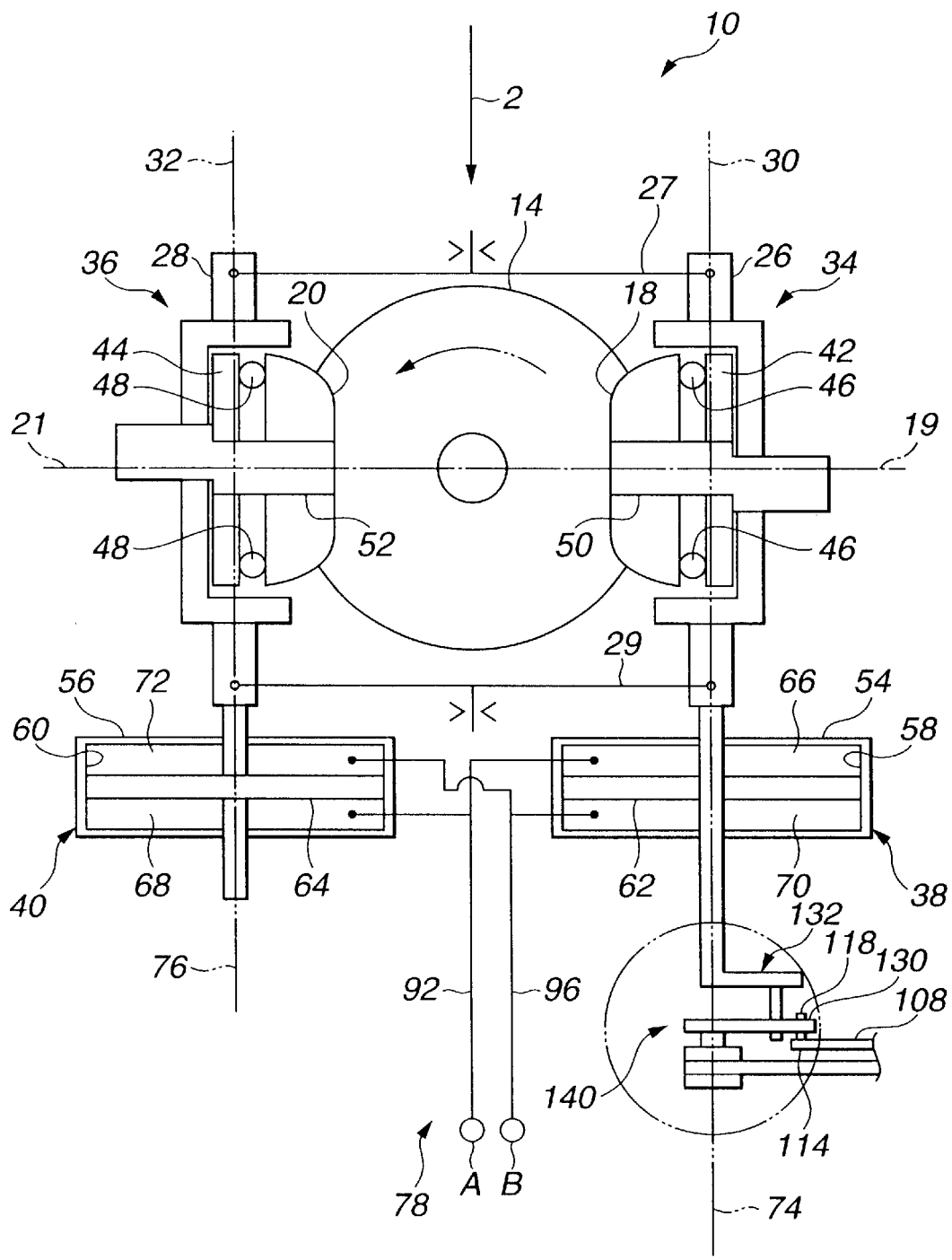
FIG. 1 is a schematic view of a portion of a T-CVT, showing two traction roller assemblies, which have pivot trunnions supporting traction rollers disposed in a toroidal cavity defined between input and output toroidal discs.

A dual cavity toroidal drive 10 of a T-CVT is partly illustrated in FIG. 1. The dual cavity traction drive 10 includes two outboard discs, which are mounted to rotate in unison and receives input torque. Drive 10 further includes two inboard discs, which are positioned back-to-back and coupled to an output gear to rotate in unison. One example of a dual cavity toroidal drive having dual inboard discs positioned back-to-back is disclosed in U.S. Pat. No. 5,902,208 issued May 11, 1999 to Nakano, which is incorporated in its entirety herein by reference.

Figure 2:
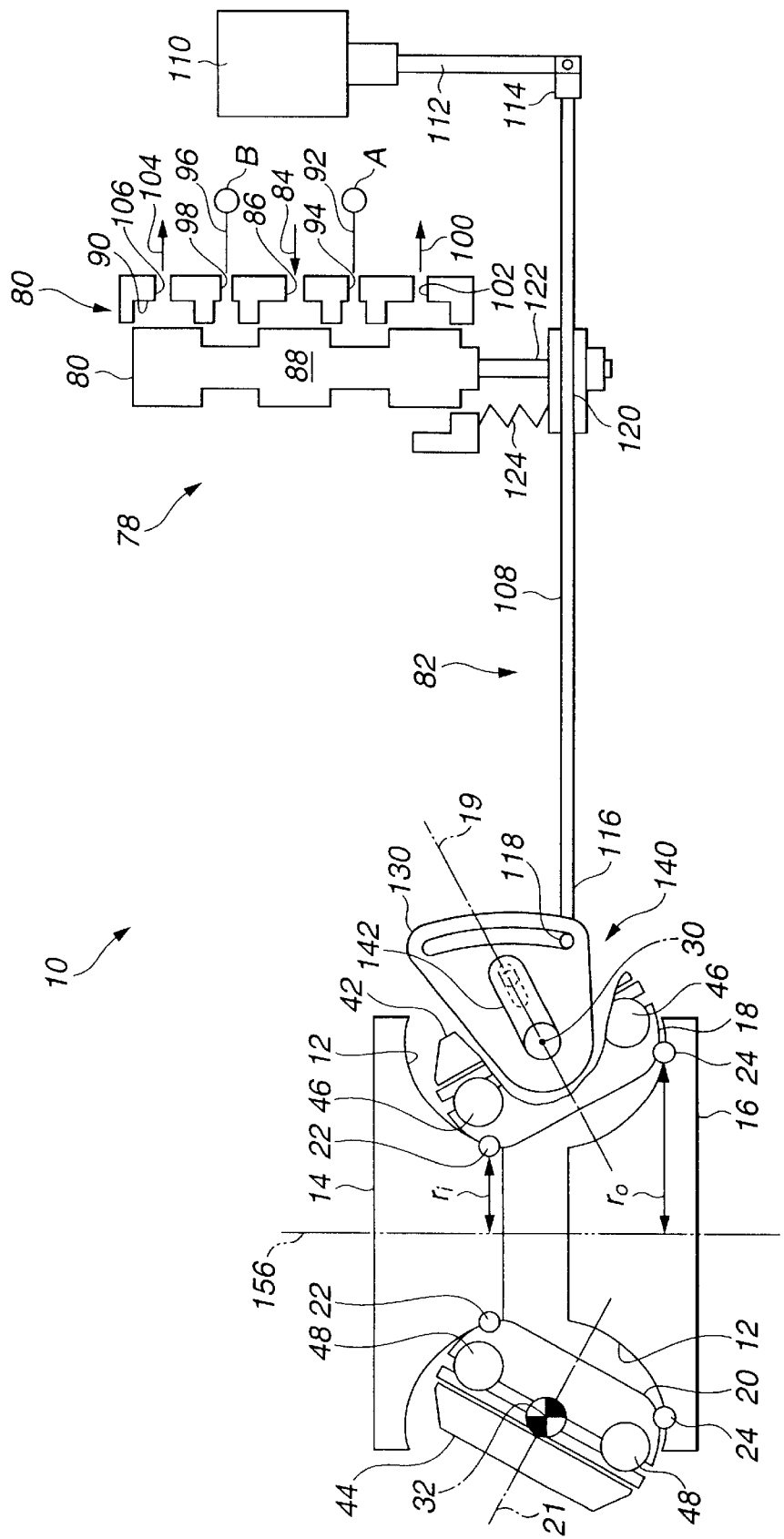
FIG. 2 is a schematic plan view of FIG. 1 as viewed in the direction of an arrow 2, with unnecessary portions broken away to show a ratio control system according to the present invention.

With reference also to FIG. 2, a toroidal cavity is defined between each of outboard discs and one of the inboard discs, only one such toroidal cavity being shown at 12 defied between outboard and inboard discs 14 and 16. As outboard disc 14 receives input torque and inboard disc 16 provides output torque, they are hereinafter refereed to as input and output discs, respectively. A pair of motion transmitting traction rollers is disposed in each toroidal cavity. Each pair of traction rollers are mirror images of the other pair; therefore, only the one pair of rollers 18 and 20 are illustrated in FIG. 2. Each pair of traction rollers, for example, 18 and 20 are engaged between each input discs, for example, 14 and one of the output discs, for example 16, in circles of varying diameters depending on the transmission ratio. Traction rollers, for example, 18 and 20 are so supportive that they can be moved to initiate a change in the ratio. That is, each roller, for example, 18 and 20 can be actuated to vary its diameter and provide a substantial normal force at their points, for example, 22 and 24 of contact with the corresponding discs to sufficiently support the traction forces needed to effect the change in ratio. With input discs, for example, 14 being rotated continuously by an engine, input disc 14 impinges on traction rollers 18 and 20, causing the traction rollers to rotate. As they rotate, the traction rollers impinge on and rotate output disc 16 in a direction opposite to that of rotating input disc 14.

Referring to FIG. 2, toroidal drive 10 in this embodiment includes two traction rollers 18, 20 in each toroidal cavity. Rollers 18, 20 are rotatably supported by pivot trunnions 26, 28, respectively. As schematically shown in FIG. 1, pivot trunnions 26, 28, in turn, are supported to pivot about their respective pivot axis 30, 32. In particular, each of trunnions 26, 28 is supported at two spaced upper and lower mount sites by an upper link 27 and a lower link 29. Each of traction rollers 18, 20 and the corresponding pivot trunnion 26, 28 are components of traction roller assemblies 34, 36.

Traction roller assemblies 34, 36 each also include a hydraulic piston assembly 38, 40 in addition to the pivot trunnion 26, 28. Pivot trunnions 26, 28 each have a backing plate 42, 44 that supports traction roller 18, 20 rotatably. Bearings 46, 48 positioned between backing plate 42, 44 and traction roller 18, 20 permit relative rotation between backing plate 42, 44 and traction roller 18, 20. Backing plates 42, 44 each have an extension 50, 52 that supports traction roller 18, 20, on a bearing not shown, for rotation about their rotation axes 19 and 21.

Hydraulic piston assembly 38, 40 includes a housing 54, 56 enclosing a cylinder 58, 60 in which is slidably disposed a piston and rod 62, 64. Piston and rod 62, 64 divides cylinder 58, 60 into equal area chambers including a first chamber 66, 68 and a second chamber 70, 72. Piston and rod 62, 64 is disposed so that its centerline 74, 76 is disposed substantially along pivot axis 30, 32, respectively. So positioned, piston and rod 62, 64 is able to pivot about pivot axis 30, 32 with pivot trunnion 26, 28, respectively.

The pressures in first and second chambers 66, 68, 70, 72 are established by a hydraulic control system 78. Hydraulic control system 78 includes a pump, not shown, a pressure regulator valve, not shown, a ratio control valve 80, and a feedback structure 82. The pump is a conventional pump that draws hydraulic fluid from a reservoir, not shown, and delivers the fluid to the pressure regulator from which the fluid is delivered to ratio control valve 80 through a supply passage 84.

The pressure regulator delivers system (or line) pressure to supply passage 84 that is connected to an inlet port 86 of ratio control valve 80. Ratio control valve 86 has a spool 88 slidably disposed in a valve bore 90. Valve bore 90 is in fluid communication with supply passage 84 via inlet port 86. Valve bore 90 is also in fluid communication with a first control passage 92 via a first control port 94, and with a second control passage 96 via a second control port 98. Valve bore 90 is further in fluid communication with a first drain passage 100 via a first drain port 102, and with a second drain passage 104 via a second drain port 106.

Spool 88 is connected to a feedback linkage 108, which is a component of feedback structure 82. A ratio control element 110, in the form of a stepper motor, for example, receives a control signal. The control signal is a command indicative of motor steps if a stepper motor is used as the ratio control element. In response to the control signal, stepper motor 110 moves feedback linkage 108, connected to an output shaft 112, to initiate the ratio change in toroidal drive 10. Feedback linkage 108 has one end portion 114 connected to output shaft 112 of the ratio control element 110, an opposite end portion 116 connected to a cam follower 118. At a third portion 120 between the one end portion 114 and the opposite end portion 116, the feedback linkage 108 is connected to a rod 122 fixed to spool 88. A return spring 124 is operatively disposed to bias spool 88 in a direction to assist spool to resume its equilibrium state.

Figure 3:
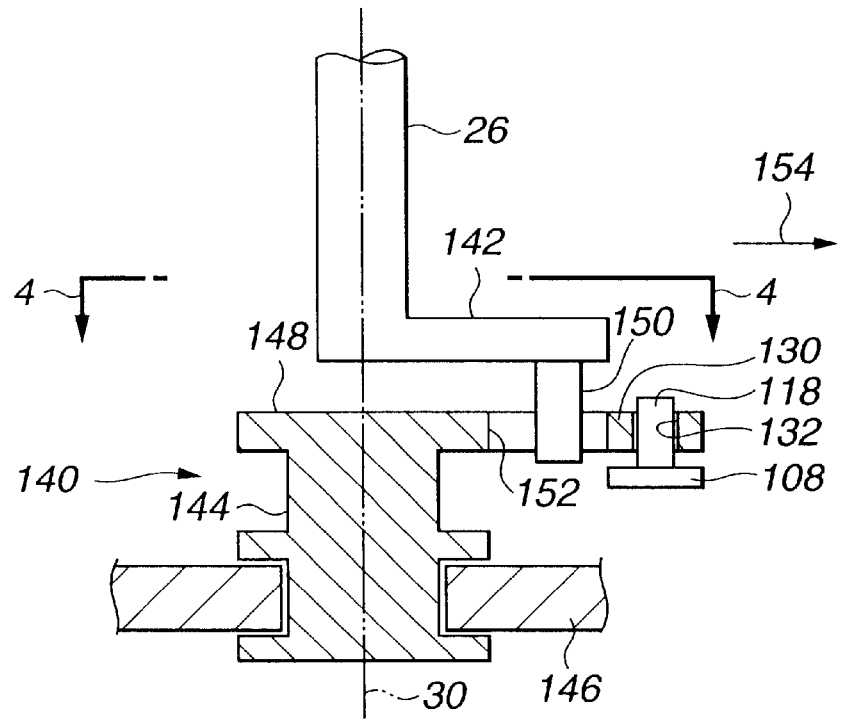
FIG. 3 is an enlarged portion of FIG. 1 enclosed by the phantom line circle and a cross section taken through the line 3—3 in FIG. 4, showing a first exemplary embodiment of a lost motion cam actuator according to the present invention.
Figure 4:
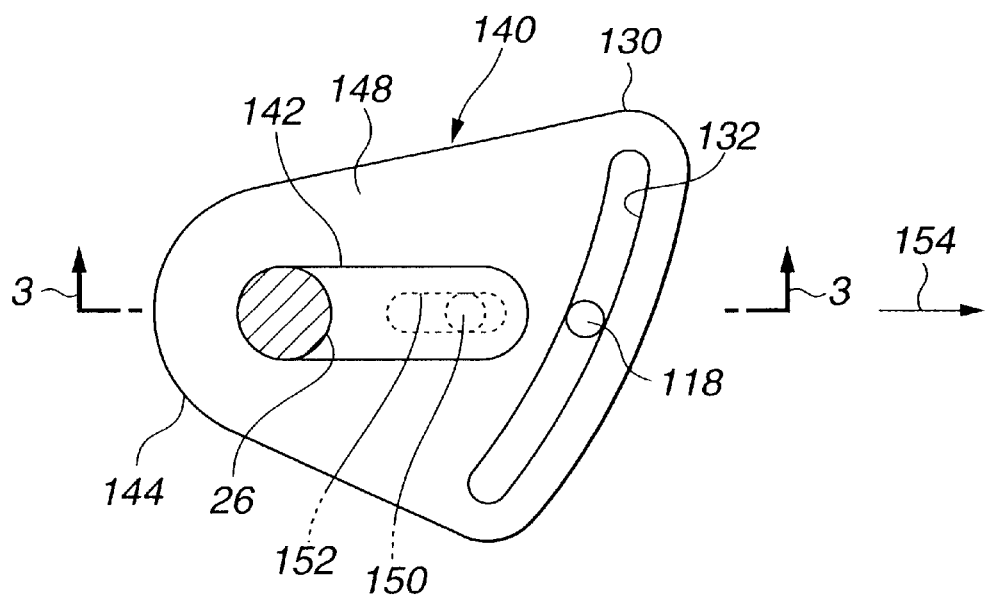
FIG. 4 is a cross section taken through the line 4—4 in FIG. 3.

Referring also to FIGS. 3 and 4, feedback structure 82 includes a feedback cam 130 cooperating with cam follower 118. As best seen in FIG. 4, in the embodiment, feedback cam 130 is formed with a curved elongate opening 132 receiving cam follower 118. Feedback structure 82 also includes a lost motion cam actuator 140. Lost motion cam actuator 140 is provided between pivot trunnion 26 of traction roller assembly 34 and feedback cam 130 to permit limited independent deflected movement of trunnion 26 from pivot axis 30 thereof without requiring corresponding movement of feedback cam 130.

In exemplary embodiments, the lost motion cam actuator includes a pin and a guide receiving the pin. One of the pin and the guide is fixed to the predetermined pivot trunnion, and the other fixed to the feedback cam.

With continuing reference to FIGS. 3 and 4, in the embodiment, lost motion cam actuator 140 includes a leg 142 fixed to the pivot trunnion 26. Leg 142 extends from trunnion 26 outwardly of toroidal cavity 12 in a direction parallel to the rotation axis 19. Lost motion cam actuator 140 also includes a shaft 144, and a stationary member 146. Stationary member 146 supports shaft 144 for rotation about a shaft axis that is in alignment with the pivot axis 30. In the embodiment, stationary member 146 is a valve body of ratio control valve 80 although it may be a part of other members including a casing of T-CVT or a housing of hydraulic control system. Shaft 144 includes a sector portion 148 extending under leg 142. Lost motion cam actuator 140 includes a pin 150 fixed to leg 142, and a guide in the form of the sector portion 148. Sector portion 148 is formed with an elongate guide opening 152 receiving pin 150. Sector portion 148 is fixed to feedback cam 130 such that rotation of shaft 144 causes cam follower 118 to move along a designed trajectory. In the embodiment, the feedback cam 130 and sector portion 148 are formed as an integral piece. The geometry of elongate guide opening 152 and pin 150 is such that sector portion 144 permits limited independent deflected movement of pivot trunnion 26 from pivot axis 30 without requiring corresponding movement of feedback cam 130. Further, according to this geometry, sector portion 144 permits dependent angular movement of pivot trunnion 26 about pivot axis 30 with requiring corresponding movement of feedback cam 130. In each of FIGS. 3 and 4, an arrow 154 indicates a direction parallel to rotation axis 19 of traction roller 18. Pin 150 moves in the direction indicated by arrow 154 when pivot trunnion 26 is deflected from pivot axis 30 under stressed condition by thrust load that increases as input torque to input disc 14 (see FIG. 2) increases. From the preceding description, it is appreciated that lost motion cam actuator 140 provides accurate information as to angular displacement of pivot trunnion 26 over operating range of different magnitudes of input torque.

Returning back to FIG. 2, as stepper motor 110 moves feedback linkage 108, the ratio control valve 80, in response to movement of valve rod 122, alters the hydraulic pressure in passages 92 and 96. As the pressure in passages 92 and 96 is altered, traction roller assemblies 34 and 36 move along pivot axes 30 and 32 in the opposite directions and then pivot about pivot axes 30 and 32, changing a ratio between $r_i$ and $r_o$, where $r_i$ is the radius joining the axis 156 of rotation of discs 14 and 16 and contact point 22, and $r_o$ is the radius joining the axis 156 and contact point 24. As traction roller assembly 34 pivots, lost motion cam actuator 140 rotates feedback cam 130 to move feedback linkage 108. This movement of feedback linkage 108, due to rotation of feedback cam 130 and movement of cam follower 118, repositions valve rod 122, providing means for ratio control valve 80 to reinstate hydraulic pressure in passages 92 and 96, allowing traction roller assemblies 34 and 36 to reinstate their original axial position with their angular position held.

From the preceding description, it is appreciated that lost motion cam actuator 140 provides accurate information as to angular position of pivot trunnion 26 over operating range of different magnitude of input torque, thus providing an enhanced ratio control by keeping the ratio invariable with different magnitudes of input torque in response to the same ratio command.

Figure 5:
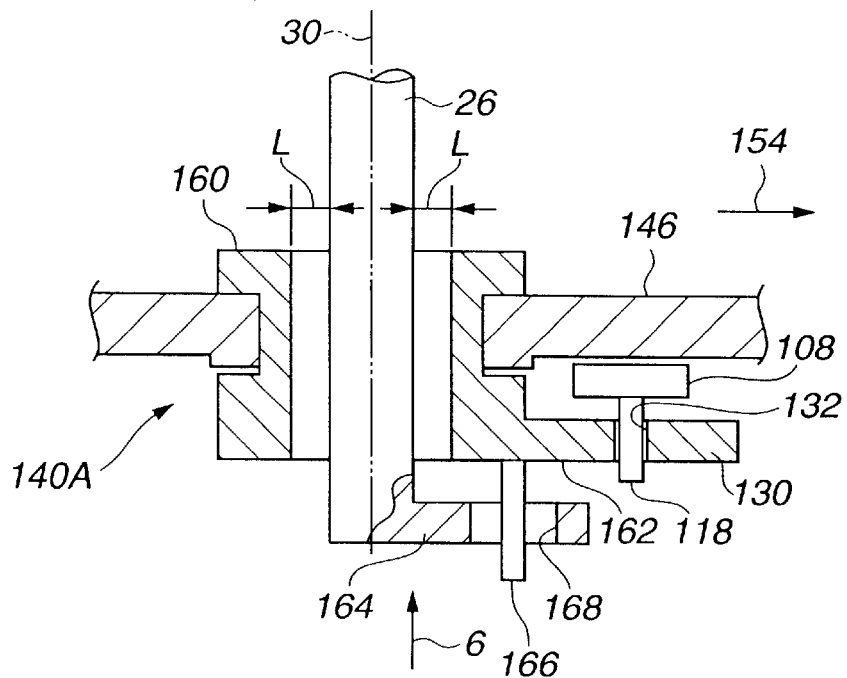
FIG. 5 is a cross section taken through the line 5—5 in FIG. 6, showing a second exemplary embodiment of a lost motion cam actuator according to the present invention.
Figure 6:
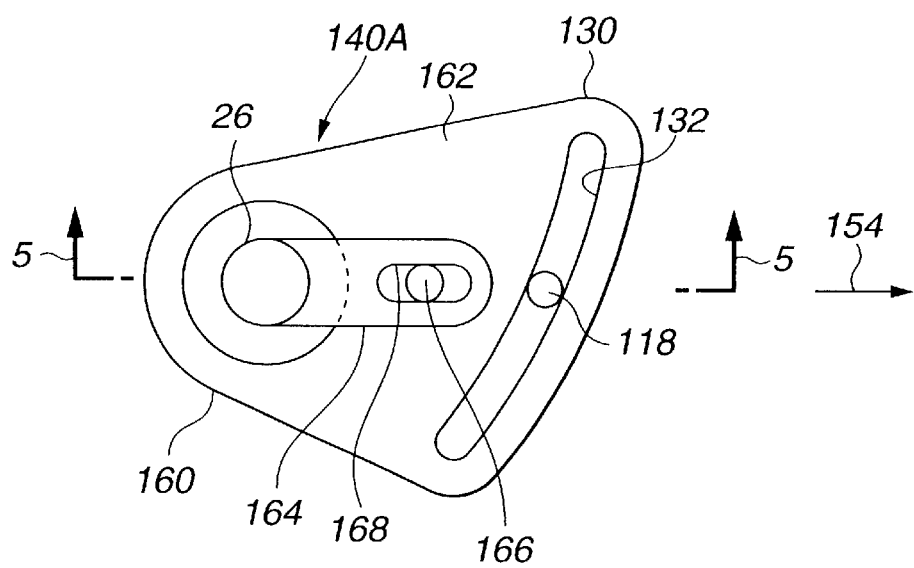
FIG. 6 is a bottom plan viewing FIG. 6 in the direction of an arrow 6.

With reference to FIGS. 5 and 6, another exemplary embodiment of a lost motion cam actuator is generally denoted by reference numeral 140A. Lost motion cam actuator 140A is substantially the same as lost motion cam actuator 140, but the former is different in structure from the latter. Accordingly, like reference numerals are used throughout various views in FIGS. 1 to 6.

In the embodiment, lost motion cam actuator 140A includes a shaft 160 that is supported by a stationary member 146 for rotation about a shaft axis that is in alignment with the pivot axis 30. As different from lost motion cam actuator 140, shaft 160 is an oversized sleeve receiving a pivot trunnion 26 with clearance as indicated by L to permit limited independent deflected movement of pivot trunnion 26 from pivot axis 30 without requiring corresponding movement of a feedback cam 130. Shaft 160 includes a sector portion 162. Lost motion cam actuator 140A includes a leg 164 fixed to the pivot trunnion 26. As best seen in FIG. 5, leg 164 extends under sector portion 162. In particular, leg 164 extends from trunnion 26 outwardly of toroidal cavity 12 in a direction parallel to the rotation axis 19 of a traction roller 18 (see also FIG. 2). Lost motion cam actuator 140A includes a pin 166 fixed to sector portion 162, and a guide in the form of the leg 164. Leg 164 is formed with an elongate guide opening 168 receiving pin 166. Sector portion 162 is fixed to feedback cam 130 such that rotation of shaft 160 causes a cam follower 118 to move along a designed trajectory. In the embodiment, the feedback cam 130 and sector portion 162 are formed as an integral piece. The geometry of elongate guide opening 168 and pin 166 is such that sector portion 162 permits limited independent deflected movement of pivot trunnion 26 from pivot axis 30 without requiring corresponding movement of feedback cam 130. Further, according to this geometry, sector portion 162 permits dependent angular movement of pivot trunnion 26 about pivot axis 30 with requiring corresponding movement of feedback cam 130. From the preceding description, it is appreciated that lost motion cam actuator 140A provides accurate information as to angular displacement of pivot trunnion 26 over operating range of different magnitudes of input torque.

With reference to FIGS. 3–6, to minimize clearance between pin 150 (or 166) and elongate guide opening 152 (or 168) of guide 148 (or 164), lost motion cam actuator 140 (or 140A) may be provided with a spring interconnecting the pin and the guide. The provision of such spring to minimize the clearance is aimed at ensuring accurate transmission of angular movement of trunnion 26 to corresponding angular movement of feedback cam 130.

Figure 7:
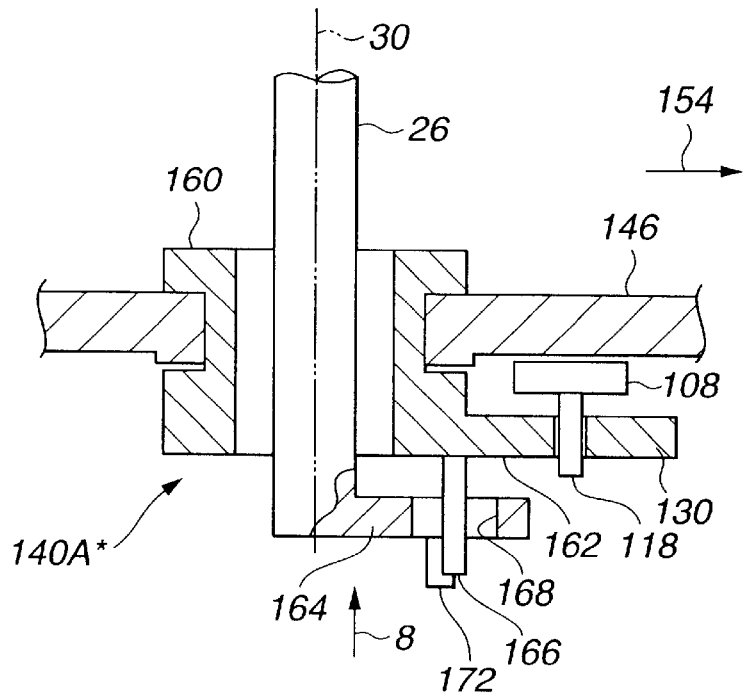
FIG. 7 is a cross section taken through the line 7—7 in FIG. 8, showing a modification.
Figure 8:
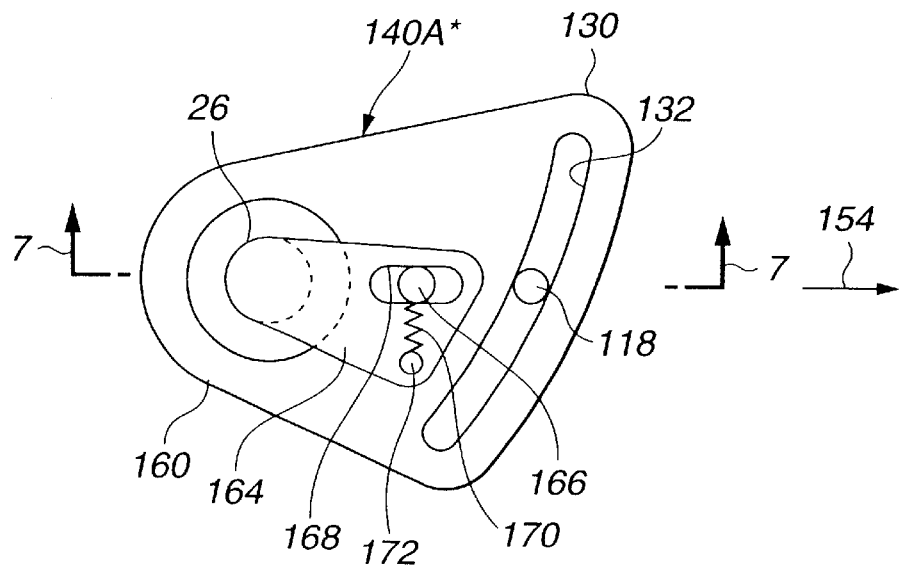
FIG. 8 is a bottom plan viewing FIG. 7 in the direction of an arrow 8.

With reference to FIGS. 7 and 8, the provision of such spring is implemented by modifying lost motion cam actuator 140A. The modified lost motion cam actuator is now generally denoted by the reference numeral 140A*. Lost motion cam actuator 140A* is substantially the same as lost motion cam actuator 140A except the provision of a spring 170. Spring 170 interconnects a pin 166 and an anchor post 172 fixed to a leg 164. Leg 164 shown in FIG. 8 is slightly enlarged as compared to its counterpart shown in FIG. 6 to provide a mount site for anchor post 172. Spring 170 resiliently biases pin 166 into engagement with one of two parallel sidewalls of elongate guide opening 168.

In each of the previously described lost motion cam actuators 140, 140A and 140A*, pin 150, 166 extends in parallel to pivot axis 30 and its cooperating elongate guide opening 152, 168 opens in one and the opposite directions along the pivot axis 30. Apparently, this pin and guide opening relationship permits axial displacement of pivot trunnion 26 without corresponding movement of feedback cam 130. If need arises to carry out feedback control on both the trunnion angular displacement and axial displacement, the provision of another feedback mechanism may suffice. For understanding such need, reference is made to U.S. Pat. No. 5,885,185 issued Mar. 23, 1999 to Kidokoro et al., which is hereby incorporated by reference in its entirety.

Figure 9:
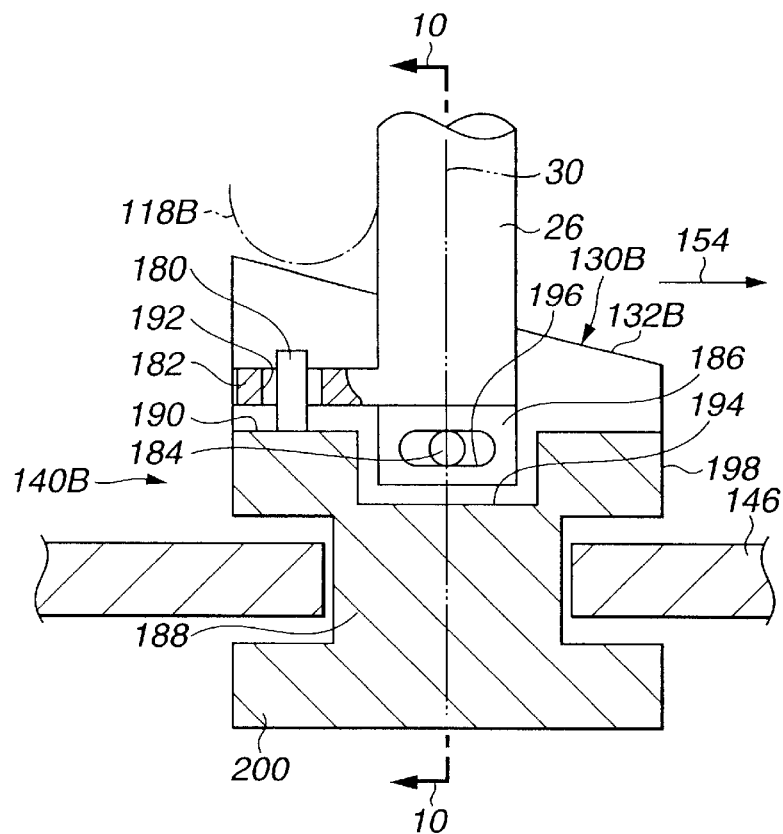
FIG. 9 is a cross section taken through the line 9—9 in FIG. 10, showing a third exemplary embodiment according to the present invention.
Figure 10:
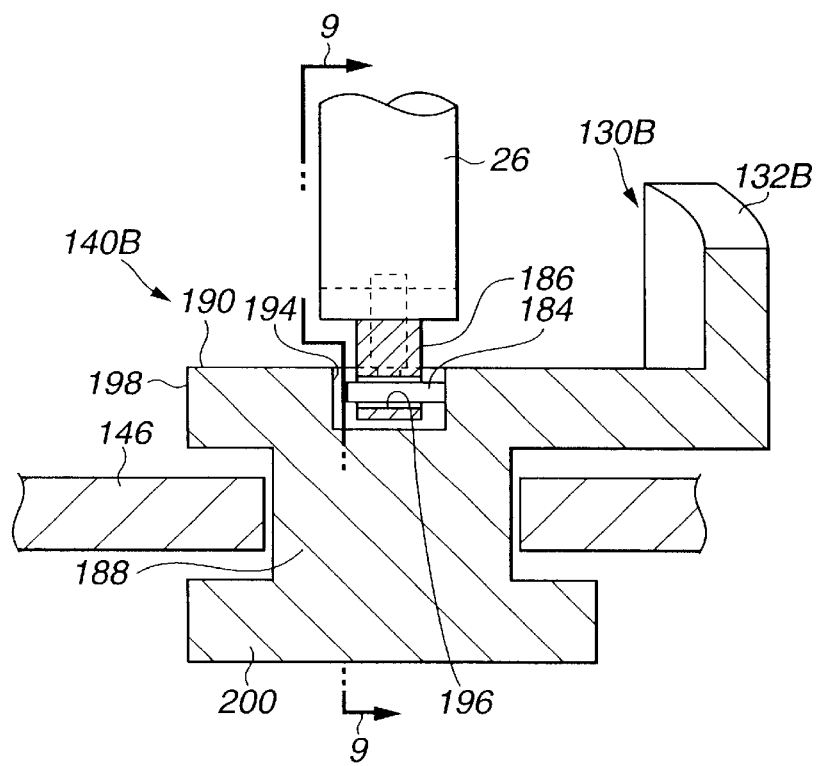
FIG. 10 is a cross section taken through the line 10—10 in FIG. 9.

With reference now to FIGS. 9 and 10, still another exemplary embodiment of a lost motion cam actuator is generally denoted by reference numeral 140B. In the embodiment, a cam follower 118B and a feedback cam 130B are different in configuration from the cam follower 118 and the feedback cam 130 illustrated in FIGS. 3 and 4. Cam follower 118B is a bell crank lever, which is linked to the other end portion 116 of a linkage 108 at one end and held in sliding engagement with a slope 132B of the feedback cam 130B at the other end. Using such cam follower 118B and feedback cam 130B, the trunnion angular displacement plus axial displacement are converted into an angular displacement of the other end portion 116 of feedback linkage 108.

In FIGS. 9 and 10, lost motion cam actuator 140B has great similarity to lost motion cam actuator 140 (see FIGS. 3 and 4). Accordingly, like reference numerals are used throughout various views in FIGS. 3, 4, 9 and 10.

Similarly to lost motion cam actuator 140, lost motion cam actuator 140B includes a first pin 180 and a first guide, in the form of a leg 182, receiving the first pin. As different from actuator 140, actuator 140B includes a second pin 184 and a second guide, in the form of a slide 186, receiving the second pin to permit limited independent deflected movement of a pivot trunnion 26 from a pivot axis 30 thereof without requiring corresponding movement of feedback cam 130B.

In particular, lost motion cam actuator 140B includes, as the first guide, the above-mentioned leg 182. Leg 182 is fixed to pivot trunnion 26 and extends outwardly of toroidal cavity 12 in a direction parallel to the rotation axis 19 of traction roller 18. Lost motion cam actuator 140B also includes a shaft 188, and a stationary member 146. Stationary member 146 supports shaft 188 for rotation about a shaft axis that is in alignment with the pivot axis 30. Shaft 188 is mounted for limited axial movement along the shaft axis that is in alignment with pivot axis 30. Shaft 188 includes a sector portion 190 extending under leg 182. In the embodiment, first pin 180 is fixed to sector portion 190 and received in first guide in the form of leg 182. Leg 182 is formed with a first elongate guide opening 192 receiving first pin 180. Sector portion 190 is fixed to feedback cam 130B such that rotation of shaft 188 causes cam follower 118B to move along a designed trajectory. In the embodiment, the feedback cam 130B and sector portion 190 are formed as an integral piece. The geometry of first elongate guide opening 192 and first pin 180 is such that sector portion 190 permits limited independent deflected movement of pivot trunnion 26 from pivot axis 30 without requiring corresponding movement of feedback cam 130B. Further, according to this geometry, sector portion 190 permits dependent angular movement of pivot trunnion 26 about pivot axis 30 with requiring corresponding movement of feedback cam 130B.

In the embodiment, shaft 188 is formed with a trench 194 under bottom axial end of pivot trunnion 26. Second pin 184 is fixed to shaft 188 and extends into trench 194. Second pin 184 is received in second guide in the form of slide 186. Slide 186 is fixed to the bottom end of pivot trunnion 26 and received in trench 194. Slide 186 is formed with a second elongate guide opening 196 receiving second pin 184. Trench 194 is oversized to allow movement of slide 186 relative to shaft 188 to permit limited independent deflected movement of pivot trunnion 26 from pivot axis 30 without requiring corresponding movement of feedback cam 130B. The geometry of second elongate guide opening 196 and second pin 180 is such that sector portion 190 of shaft 188 permits such limited independent deflected movement of pivot trunnion 26 without requiring corresponding movement of feedback cam 130B. Further, according to this geometry, sector portion 190 permits dependent axial movement of pivot trunnion 26 along pivot axis 30 with requiring corresponding movement of feedback cam 130B. In the embodiment shown in FIGS. 9 and 10, shaft 188 is provided with upper and lower flange portions 198 and 200 to limit the axial movement of thereof.

With reference to FIGS. 11 and 12, other exemplary embodiment of a lost motion cam actuator is generally denoted by reference numeral 140C. Lost motion cam actuator 140C is substantially the same as lost motion cam actuator 140B, but the former is different in structure from the latter. Accordingly, like reference numerals are used throughout various views in FIGS. 9–12.

In the embodiment, lost motion cam actuator 140C includes a shaft 210 that is supported by a stationary member 146 for rotation about a shaft axis that is in alignment with pivot axis 30 as well as for limited axial movement along the pivot axis. As different from lost motion cam actuator 140B, shaft 210 is an oversized sleeve receiving a pivot trunnion 26 with clearance as indicated by L to permit limited independent deflected movement of pivot trunnion 26 from pivot axis 30 without requiring corresponding movement of a feedback cam 130B. Shaft 210 includes a sector portion 212. Lost motion cam actuator 140C includes a leg 214 fixed to pivot trunnion 26. As best seen in FIG. 11, leg 214 extends under sector portion 212. In particular, leg 214 extends from trunnion 26 outwardly of toroidal cavity 12 in a direction parallel to the rotation axis 19 of a traction roller 18 (see also FIG. 2). Lost motion cam actuator 140C includes a first pin 216 fixed to sector portion 212, and a first guide in the form of the leg 214. Leg 214 is formed with a first elongate guide opening 218 receiving first pin 216. Sector portion 212 is fixed to feedback cam 130B such that rotation of shaft 210 causes a cam follower 118B to move along a designed trajectory. In the embodiment, the feedback cam 130B and sector portion 212 are formed as an integral piece. The geometry of first elongate guide opening 218 and first pin 216 is such that sector portion 212 permits limited independent deflected movement of pivot trunnion 26 from pivot axis 30 without requiring corresponding movement of feedback cam 130B. Further, according to this geometry, sector portion 212 permits dependent angular movement of pivot trunnion 26 about pivot axis 30 with requiring corresponding movement of feedback cam 130B.

As different from lost motion cam actuator 140B, lost motion cam actuator 140C includes a second pin 220 and a second guide 222 located within oversized sleeve 210. The second guide is a transverse groove or slot 222 cut into peripheral wall of pivot trunnion 26. This groove receives second pin 220. The geometry of second guide groove 222 and second pin 220 is such that sector portion 212 of shaft 210 permits such limited independent deflected movement of pivot trunnion 26 without requiring corresponding movement of feedback cam 130B. Further, according to this geometry, sector portion 212 permits dependent axial movement of pivot trunnion 26 along pivot axis 30 with requiring corresponding movement of feedback cam 130B. In the embodiment shown in FIGS. 11 and 12, shaft 210 is provided with upper and lower flange portions 224 and 226 to limit the axial movement of thereof.

With reference to FIGS. 9–12, to minimize clearance between first pin 180 (or 216) and first elongate guide opening 192 (or 218) of first guide 182 (or 214), lost motion cam actuator 140B (or 140C) may be provided with a first spring operatively acting between the first pin and the first guide. The provision of such spring to minimize the clearance is aimed at ensuring accurate transmission of angular movement of trunnion 26 to corresponding angular movement of feedback cam 130B.

Further, to minimize clearance between second pin 184 (or 220) and second elongate guide opening or groove 196 (or 222) of second guide 186 (or 222), lost motion cam actuator 140B (or 140C) may be provided with a second spring operatively acting between the second pin and the second guide. The provision of such spring to minimize the clearance is aimed at ensuring accurate transmission of axial movement of trunnion 26 to corresponding movement of feedback cam 130B.

Figure 13:
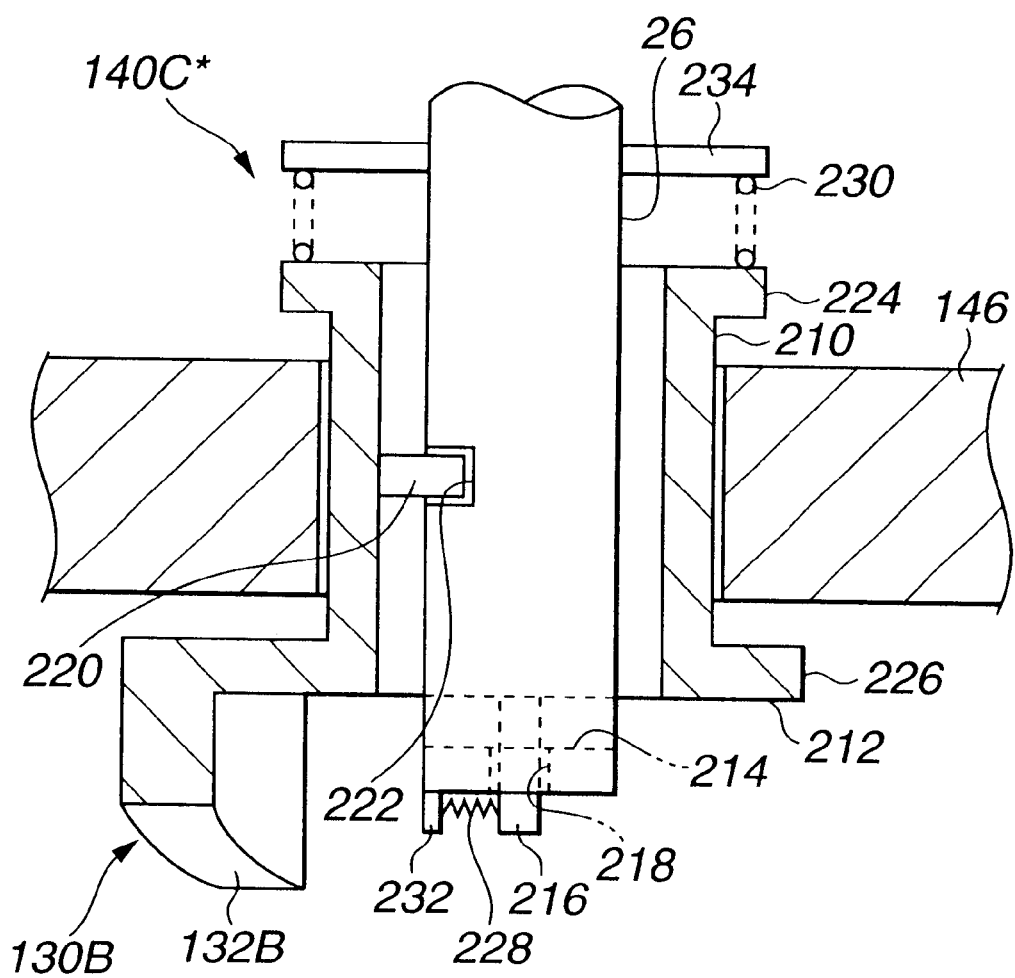
FIG. 13 is a similar view to FIG. 12, showing a modification.

With reference to FIG. 13, the provision of such first and second springs is implemented by modifying lost motion cam actuator 140C. The modified lost motion cam actuator is now generally denoted by the reference numeral 140C*. Lost motion cam actuator 140C* is substantially the same as lost motion cam actuator 140C except the provision of first and second springs 228 and 230. First spring 228 interconnects a first pin 216 and an anchor post 232 fixed to a first guide in the form of a leg 214 (see FIG. 11 also). First spring 228 resiliently biases first pin 216 into engagement with one of two parallel sidewalls of first elongate guide opening 218. Second spring 230 is operatively disposed between an upper flange portion 224 of a shaft 210 and a spring retainer 234 to operatively act between a second pin 220 and a second guide groove 222. Second spring 230 resiliently biases second pin 220 into engagement with one of two parallel sidewalls of second guide groove 222.

With reference again to FIG. 2, in the preceding description, each of the lost motion cam actuators is operatively connected to the other end portion 116 of feedback linkage 108. In FIG. 2, the linkage 108 is illustrated as a single lever for simplicity of illustration only. Other types of linkage may be used. For example, a linkage may include a plurality of levers operatively linked. Such feedback linkages are only examples of feedback structure 82. The feedback structure 82 may use other mechanism.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. P2001-89217, filed Mar. 23, 2001, the disclosure of which is hereby incorporated by reference in its entirety.

What is claimed is:

1. A ratio control for a toroidal-type traction drive, comprising:
   toroidal discs defining a toroidal cavity;
   traction roller assemblies having pivot trunnions rotatably supporting traction rollers disposed in the toroidal cavity and engaged between the toroidal discs, each of the pivot trunnions having a pivot axis, the pivot trunnions including a predetermined pivot trunnion;
   a ratio control element positionable to establish various ratios between the toroidal discs;
   a feedback structure connected to the ratio control element and including a ratio control valve to hydraulically control the traction roller assemblies, and a cam follower;
   a feedback cam cooperating with the cam follower; and
   a lost motion cam actuator between the predetermined pivot trunnion and the feedback cam to permit limited independent deflected movement of the predetermined pivot trunnion from the pivot axis thereof without requiring corresponding movement of the feedback cam.

2. The ratio control as claimed in claim 1, wherein the lost motion cam actuator includes a pin and a guide receiving the pin, and wherein one of the pin and the guide is fixed to the predetermined pivot trunnion, and the other fixed to the feedback cam.

3. The ratio control as claimed in claim 1, wherein the lost motion cam actuator includes a shaft fixed to the feedback cam, a stationary member supporting the shaft for rotation about a shaft axis, a pin and a guide receiving the pin, and wherein one of the pin and the guide is fixed to the predetermined pivot trunnion, and the other fixed to the shaft.

4. The ratio control as claimed in claim 3, wherein the shaft is an oversized sleeve receiving the predetermined pivot trunnion to permit limited independent deflected movement of the predetermined pivot trunnion from the pivot axis thereof without requiring corresponding movement of the feedback cam.

5. The ratio control as claimed in claim 3, wherein the pin and the guide permit dependent angular movement of the predetermined pivot trunnion with requiring the corresponding movement of the feedback cam.

6. The ratio control as claimed in claim 5, wherein the pin is movable relative to the guide along an imaginary line extending outwardly in a radial direction from the pivot axis of the predetermined pivot trunnion.

7. The ratio control as claimed in claim 5, wherein the lost motion cam actuator includes a leg fixed to the predetermined pivot trunnion, wherein the pin is fixed to the leg, and wherein the guide is a sector portion of the shaft, the sector portion being formed with an elongate guide opening receiving the pin.

8. The ratio control as claimed in claim 5, wherein the guide is a leg fixed to the predetermined pivot trunnion, the leg being formed with an elongate guide opening receiving the pin, wherein the pin is fixed to a sector portion of the shaft.

9. The ratio control as claimed in claim 8, wherein the shaft is an oversized sleeve receiving the predetermined pivot trunnion to permit limited independent deflected movement of the predetermined pivot trunnion from the pivot axis thereof without requiring corresponding movement of the feedback cam.

10. The ratio control as claimed in claim 2, wherein the lost motion cam actuator includes a spring operatively interconnecting the pin and the guide to minimize clearance therebetween to ensure accurate transmission of angular movement of the predetermined pivot trunnion to corresponding angular displacement of the feedback cam.

11. The ratio control as claimed in claim 2, wherein the lost motion cam actuator includes:

a second pin; and a second guide receiving the second pin, one of the pin and the guide being fixed to the predetermined pivot trunnion, and the other fixed to the feedback cam to permit limited independent deflected movement of the predetermined pivot trunnion from the pivot axis thereof without requiring corresponding movement of the feedback cam.

12. The ratio control as claimed in claim 5, wherein the lost motion cam actuator includes:

a second pin; and a second guide receiving the second pin, one of the second pin and the second guide being fixed to the predetermined pivot trunnion, and the other fixed to the shaft to permit limited independent deflected movement of the predetermined pivot trunnion from the pivot axis thereof without requiring corresponding movement of the feedback cam.

13. The ratio control as claimed in claim 12, wherein the shaft is mounted for limited axial movement along the shaft axis, and wherein the second pin and the second guide permit dependent axial movement of the predetermined pivot trunnion along the pivot axis thereof with requiring the corresponding movement of the feedback cam.

14. The ratio control as claimed in claim 13, wherein the shaft is an oversized sleeve receiving the predetermined pivot trunnion to permit limited independent deflected movement of the predetermined pivot trunnion from the pivot axis thereof, and wherein the second pin and the second guide are located within the oversized sleeve.

15. The ratio control as claimed in claim 11, where the lost motion cam actuator includes a first spring operatively acting between the first mentioned pin and the first mentioned guide to minimize clearance therebetween.

16. The ratio control as claimed in claim 15, wherein the lost motion cam actuator includes a second spring operatively acting between the second pin and the second guide to minimize clearance therebetween to ensure smooth relative movement.

17. The ratio control as claimed in claim 13, wherein the second guide is a slide fixed to the predetermined pivot trunnion, the slide being formed with an elongate guide opening receiving the second pin, and wherein the shaft is formed with an oversized trench receiving the slide to permit independent deflected movement of the predetermined pivot trunnion from the pivot axis.

18. The ratio control as claimed in claim 17, wherein the elongate guide opening of the slide and the second pin allow relative movement with each other to permit limited movement of the slide within the trench.

19. The ratio control as claimed in claim 14, wherein the second guide is a transverse guide groove cut into the predetermined pivot trunnion, said transverse guide groove receiving the second pin.

20. A ratio control for a toroidal-type traction drive, comprising:

toroidal discs defining a toroidal cavity;

traction roller assemblies having pivot trunnions rotatably supporting traction rollers disposed in the toroidal cavity and engaged between the toroidal discs, each of the pivot trunnions having a pivot axis, the pivot trunnions including a predetermined pivot trunnion;

a ratio control element positionable to establish various ratios between the toroidal discs;

a linkage having one end portion connected to the ratio control element, an opposite end portion connected to a cam follower, the linkage having a third portion between the one and the opposite end portions;

a ratio control valve connected to the third portion of the linkage to hydraulically control the traction roller assemblies;

a feedback cam cooperating with the cam follower; and a lost motion cam actuator between the predetermined pivot trunnion and the feedback cam, the lost motion actuator including pin and guide means for permitting limited independent deflected movement of the predetermined pivot trunnion from the pivot axis thereof without requiring corresponding movement of the feedback cam.

* * * * *